United States Patent Office 3,694,254
Patented Sept. 26, 1972

3,694,254
METHOD OF PRODUCING AND COATING SILVER POWDER AND THE RESULTANT PRODUCT
Warren B. Blumenthal, North Tonawanda, N.Y., assignor to National Lead Company, New York, N.Y.
No Drawing. Filed Dec. 10, 1970, Ser. No. 96,971
Int. Cl. C22b 11/04; C23f 17/00
U.S. Cl. 117—100
8 Claims

ABSTRACT OF THE DISCLOSURE

Silver powder of very fine particle size suitable for the manufacture of electroding pastes is produced by the reduction of an ammoniacal silver nitrate solution with hydrazine, treatment of the resulting aqueous slurry of silver particles with an aqueous solution of the triethanolamine soap of 2-ethylcaproic acid, and drying to form a coating of the soap on the silver powder.

BACKGROUND OF THE INVENTION

Although silver powder has long been an article of commerce, the preparation of silver powder which is highly suitable for the production of silver electroding pastes such as are employed in providing solderable electrodes on ceramic dielectric and semiconductor bodies and on ceramic resistors is expensive and presents difficulties.

SUMMARY OF THE INVENTION

Silver powder of very fine particle size suitable for the manufacture of electroding pastes is produced by the reduction of an ammoniacal silver nitrate solution with hydrazine, treatment of the resulting aqueous slurry of silver particles with an aqueous solution of the triethanolamine soap of 2-ethylcaproic acid, and drying.

DESCRIPTION OF A PREFERRED EMBODIMENT

As hereinafter explained, certain variations from and modifications of the process set out below may be made without departing from the spirit of the present invention. Best results are, however, obtained in accordance with the following example.

Example 1

98.8 g. of silver nitrate ($AgNO_3$) is dissolved in sufficient water to make 535 ml. of solution at 25° C. An ammoium hydroxide ($NH_4OH$) solution is added slowly until a precipitate forms and just redissolves. The $NH_4OH$ solution contains 27% $NH_3$ and has a specific gravity of 0.90. The resultant ammoniacal solution is then added to 9.3 g. of hydrazine ($N_2H_4$) which has been dissolved in 186 ml. of water. The addition is made slowly with constant stirring. The silver precipitates as metal. There is then stirred into the resultant slurry 12 g. of a 15% aqueous solution of triethanolammonium 2-ethylcaproate. Stirring is continued for about ½ hour and the slurry is then filtered, the filter cake being washed with 300 ml. of 5% aqueous solution of triethanolammonium 2-ethylcaproate. The cake is dried at 95° C.

The recovery of silver as a powder is substantially theoretical, i.e. 62.7 g. The product consists of easily broken aggregates or clumps of particles, the particles being about 0.1 μm. in diameter. It is light, dull yellow in color and non-metallic in appearance.

The triethanolammonium 2-ethylcaproate solution employed may be produced by adding triethanolamine ($C_6H_{15}O_3N$) to 2-ethylcaproic acid ($C_8H_{16}O_2$) dispersed in water, equal molal quantities of the reactants being used.

The concentrations of the silver nitrate solution and hydrazine solution used are not critical. The concentration of the hydrazine solution may vary from 1% to about 20% or more although about 5% is preferred. The concentration of the silver nitrate solution used is preferably about 15%. However, solutions with concentrations as low as 5% and more concentrated solutions up to 30% or more may be employed. The mole ratio of hydrazine to silver nitrate is preferably about 2:1, but the ratio may be lower or higher. Some excess hydrazine over silver nitrate is, however, desirable as this is found to hasten and promote completion of the reduction reaction.

The amount of triethanolammonium 2 - ethylcaproate soap required is quite small and is not particularly critical. Indeed, the amount remaining on the silver powder is difficult to control with accuracy because it is applied in a solution and the amount actually taken up by or deposited on the silver powder varies. However, it is generally satisfactory to have from about 0.1% to about 2.5% of the triethanolammonium 2-ethylcaproate soap associated with the dried silver powder and from about 0.2% to about 1.0% is preferred. It has been observed that excessive amounts of the soap added to the freshly precipitated powder may result in a sticky or such non-uniform deposits of soap in the powder as to render it difficult to use.

Silver powder as precipitated, coated with soap, and recovered in the manner above-described is very satisfactory for use in the manufacture of conductive electroding pastes. Such pastes are used in providing electrodes on ceramic bodies such as capacitors, thermisters, semiconductors, and the like. In the following example the making of an electroding paste from the silver powder produced by the process of Example 1 as described.

Example 2

A vehicle is prepared by mixing 11 g. of powdered ethylcellulose with 2.5 g. of powdered lecithin and stirring the mixture into 87.3 g. of ethylene glycol monobutyl ether acetate which has been warmed to 60° C., the final mixture being warmed until all gas bubbles have been released and the solution is clear.

To 26.25 g. of this vehicle there is added slowly with continuous stirring, a mixture composed of 30.0 g. of the silver powder resulting from carrying out Example 1 and 3.75 g. of a low firing ceramic frit having an analysis as follows:

| Component: | Percent |
| --- | --- |
| $Bi_2O_3$ | 80.0 |
| PbO | 15.8 |
| $B_2O_3$ | 2.1 |
| $SiO_2$ | 2.1 | and ground to pass through a 325 mesh sieve.

The resultant electroding paste when tested by painting or silk-screening it on a ceramic substrate and firing conventionally, for example at about 820° C. in an oxidizing atmosphere for about 36 minutes, was found to adhere well to the substrate, permit attachment of leads by soldering, and give good electrical contacts.

Although the vehicle described in Example 2 for applying conductive coatings utilizing silver powder produced according to the present invention is satisfactory for barium titanate capacitors, it will be understood that other vehicles, many of which are well known in the art, may be used satisfactorily.

The screens and sieves specified herein are U.S. Standard sieve sizes. Except as otherwise indicated, percentages specified or referred to herein are percentages by weight.

I claim:

1. A process for producing silver powder suitable for use in electroding compositions for providing solderable electrodes which consists essentially of mixing an ammoniacal solution of silver nitrate with an aqueous solution of hydrazine to form a slurry of precipitated silver powder, mixing with the resultant slurry an aqeuous solution of the triethanolammonium soap of 2-ethylcaproic acid to coat the silver powder with about 0.1% to about 2.5% of said soap, filtering, and drying the coated silver powder.

2. A process as set forth in claim 1 in which the silver powder is washed after filtering with an aqueous solution of the triethanolammonium soap of 2-ethylcaproic acid.

3. A process as set forth in claim 2 in which the mole ratio of hydrazine to silver nitrate is from 1:1 to about 2:1.

4. A process as set forth in claim 1 in which the mole ratio of hydrazine to silver nitrate is from 1:1 to about 2:1.

5. A process as set forth in claim 1 in which the mole ratio of hydrazine to silver nitrate is about 2:1.

6. A process as set forth in claim 1 in which from about 0.2% to about 1.0% of soap is coated on the silver powder.

7. Silver powder suitable for use in electroding compositions for providing solderable electrodes having a coating of from about 0.1% to about 2.5% of the triethanolammonium soap of 2-ethylcaproic acid.

8. Silver powder as set forth in claim 7 in which said coating consists essentially of from about 0.2% to about 1.0% of said soap.

References Cited

UNITED STATES PATENTS

| | | | |
|---|---|---|---|
| 2,216,376 | 10/1940 | Rimmel | 117—134 |
| 3,443,933 | 5/1969 | Boyhan et al. | 75—0.5 |
| 2,259,457 | 10/1941 | Croll | 75—0.5 |
| 3,201,223 | 8/1965 | Cuhra et al. | 117—100 X |
| 3,330,672 | 7/1967 | Kroll et al. | 117—134 X |
| 3,351,464 | 11/1967 | Budincevits | 117—100 X |
| 3,501,287 | 3/1970 | Lever et al. | 75—0.5 |

WILLIAM D. MARTIN, Primary Examiner

M. R. P. PERRONE, Jr., Assistant Examiner

U.S. Cl. X.R.

75—0.5A, 118; 117—49, 113, 127, 134